United States Patent
Klos et al.

(10) Patent No.: US 6,309,449 B1
(45) Date of Patent: Oct. 30, 2001

(54) GAS ACCUMULATOR

(75) Inventors: Holger Klos, Karlsruhe; Ulrich Schmitz, München; Walter Schütz, Weidenberg, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/529,190

(22) PCT Filed: Oct. 6, 1998

(86) PCT No.: PCT/DE98/03012

§ 371 Date: May 9, 2000

§ 102(e) Date: May 9, 2000

(87) PCT Pub. No.: WO99/19253

PCT Pub. Date: Apr. 22, 1999

(30) Foreign Application Priority Data

Oct. 10, 1997 (DE) .............................................. 197 45 549

(51) Int. Cl.⁷ ...................................................... B01D 53/04
(52) U.S. Cl. ................. 96/108; 95/116; 95/901; 96/153; 55/527
(58) Field of Search ........................ 55/523, 527; 95/116, 95/127, 900, 901; 96/108, 149, 153, 154

(56) References Cited

U.S. PATENT DOCUMENTS

| | | | |
|---|---|---|---|
| 3,919,369 | * | 11/1975 | Holden ............................... 96/153 X |
| 4,518,704 | * | 5/1985 | Okabayashi et al. .............. 96/153 X |
| 4,749,384 | * | 6/1988 | Nowobilski et al. .............. 96/108 X |
| 5,118,329 | * | 6/1992 | Kosaka et al. ..................... 95/901 X |
| 5,256,476 | * | 10/1993 | Tanaka et al. ..................... 95/901 X |
| 5,332,426 | * | 7/1994 | Tang et al. ............................ 96/153 |
| 5,510,063 | * | 4/1996 | Gadkaree et al. ................. 95/901 X |
| 5,626,650 | * | 5/1997 | Rodriquez et al. ................ 95/900 X |
| 5,656,069 | * | 8/1997 | Nikolskaja et al. ............... 95/901 X |
| 5,895,519 | * | 4/1999 | Lorimer ............................. 96/108 X |
| 5,958,098 | * | 9/1999 | Heung ................................ 95/127 X |
| 6,113,673 | * | 9/2000 | Loutfy et al. ...................... 96/153 X |

* cited by examiner

*Primary Examiner*—Robert H. Spitzer
(74) *Attorney, Agent, or Firm*—Cohen, Pontani, Lieberman & Pavane

(57) ABSTRACT

A gas accumulator for storing pressurized gases, in particular gaseous fuels such as hydrogen or the like, which gas accumulator has a sealed vessel which is provided with a valve-actuated feed line and outlet line for the pressurized gas and with a solid packing of carbon nanostructures. To increase the storage capacity of a gas accumulator of this type significantly, the particles of the carbon nanostructures are compacted to form larger coherent conglomerates having an apparent density which is increased in comparison with the apparent density of the originally loose particles. The compaction can be carried out, for example, by ordering the carbon nanostructures in their orientation to one another, or else by forming the conglomerates by pressing non-ordered carbon nanostructures. In each case, minimizing the interstices between the individual carbon nanostructures means that the amount of the carbon nanostructures which can be introduced into the vessel and thus the amount of the pressurized gas which can be stored in these can be increased.

28 Claims, No Drawings

GAS ACCUMULATOR

BACKGROUND OF THE INVENTION

1. Field of the Invention

The present invention relates to a gas accumulator for storing pressurized gas, which gas accumulator has a sealed vessel. The sealed vessel is provided with at least one valve-actuated feedline and outlet line for the pressurized gas and with a particulate packing of carbon nanostructures.

2. Discussion of the Prior Art

In particular, the storage of hydrogen in conventional pressurized vessels poses great difficulties if, with respect to the vessel volume, a packing density as high as possible is to be achieved. It is generally known that gas accumulators, in which hydride-forming metal alloys in finely divided form are packed have a particularly high storage capacity. However, these gas accumulators have considerable disadvantages, in particular because of their high overall weight.

Recently, proposals have become known to use, for storing gases, in particular hydrogen, what are termed carbon nanostructures which have chemisorbing properties. One such proposal can be taken from WO 97/26082, the disclosure of which to this extent is incorporated by reference into the description of the present invention. It is mentioned there that, depending on the temperature and pressure, up to 24 liters of hydrogen can be stored per gram of the carbon nanostructure material used. With regard to the technical form of the gas accumulator, it is merely stated that the vessel is provided with a hydrogen storage bed. No information is given on the packing density of the nanostructure material.

In many applications in which stored hydrogen is to be used, it is of importance to be able to store as large a gas quantity as possible, with the smallest possible storage volume and storage weight of the gas accumulator (highest possible specific storage capacity). This requirement applies especially to mobile applications, that is to say for instance in the case of hydrogen tanks for vehicles which are operated by fuel cells. Therefore, there is a requirement for increasing further the previously attainable storage capacity of gas accumulators for pressurized gases, in particular hydrogen.

SUMMARY OF THE INVENTION

The object of the invention is therefore to develop a gas accumulator of the type mentioned at the outset to the extent that its specific storage capacity is significantly increased.

This object is achieved by a gas accumulator of the type mentioned at the outset in which, according to the invention, the particles of the carbon nanostructures are compacted to form larger coherent conglomerates having an apparent density which is increased in comparison with the apparent density of the originally loose particles.

The basic concept of the present invention may be regarded as being that the storage capacity for the pressurized gas is increased in the gas accumulator by the storage mass which consists of carbon nanostructures by introducing more nanostructure material into the preset storage volume of the gas accumulator than was previously possible by simple packing of the originally prepared carbon particles having nanostructure. This is achieved by the original particles of the carbon nanostructures, as result from the production process, being compacted to give larger coherent conglomerates, so that for this conglomerate an apparent density (that is to say the weight based on the volume of the conglomerate) is produced which is significantly higher than the apparent density of the originally produced loose particles having nanostructure.

As result, the gas accumulator according to the invention is useable both for stationary and for mobile applications. In particular, the gas accumulator according to the invention is suitable for storing gaseous fuels, for example hydrogen or the like.

DESCRIPTION OF THE INVENTION

According to the invention the carbon nanostructures can be formed as nanofibers or nanotubes or nanoshells. However, preferably, the carbon nanostructures are formed as nanofibers. This embodiment in particular is considered below. However, the invention is not restricted to the embodiment of the carbon nanostructures as nanofibers.

Carbon nanofibers can have, for example, a length of up to 10 $\mu$m and an outer diameter between 20 and 140 nm. The carbon nanofibers can have, for example, individual graphite planes, with these graphite planes advantageously having a defined angle (for example 45° or 90°) to the fiber axis. The hydrogen is stored between the graphite planes.

In a preferred embodiment, the carbon nanostructures have a helical form. This helical structure can be described, for example, using the shape of a "spiral staircase". The helical carbon nanofibers thus firstly have an outer structure running in a longitudinal direction in the form of the screw line and additionally have an inner structure. This inner structure, which in the example of the "spiral staircase" would form the individual "stairs", comprises the above-described individual graphite planes in which the pressurized gas, for example the hydrogen, is stored. A structure of this type, because of its many edges, has considerable advantages with respect to charging and discharging the accumulator.

A further advantageous type of the carbon nanostructures is a tubular structure having an outer diameter of for example 35 nm and an inner diameter of for example 10 nm, so that the wall thickness is of an order of magnitude of about 10 nm. The inner structure of the fibers has graphite planes which are disposed in a herringbone shape. In this case the graphite planes can be connected in a bridge-like manner to the opposite side, in part across the inner cavity.

To achieve an advantageous storage of pressurized gas, it is envisaged in a further embodiment that the carbon nanostructures are activated. An activation of this type has the function of breaking open the carbon nanostructures, so that the pressurized gas can then be incorporated into the individual graphite planes of the inner structure.

The pressurized gas, and here for example the hydrogen, can be incorporated physically or chemically in a similar form as in metal hydrides.

Advantageously, the carbon nanostructures are activated at elevated temperature by a reaction gas which is selected, for example, from the group of gases consisting of $CO$, $CO_2$, helium or vapors of the alkali metals, alkaline earth metals or the like. Obviously, depending on demand and application, other reaction gases are conceivable and possible. The activation treatment, however, can also be performed in a wet-chemical manner using appropriate materials.

According to the invention, the carbon nanostructures can be or are prepared and/or activated and/or introduced into the gas accumulator in the absence of air. By this means, the cycle strength of the carbon nanostructures can be increased in the later accumulator use.

With respect to the possible compaction of the carbon nanostructures, two exemplary ways will be described in general hereinafter.

According to a first embodiment of the invention, the carbon nanostructures, to form the conglomerates, are ordered in their orientation to one another. Preferably, this arrangement is achieved by the carbon nanostructures being ordered essentially in the same orientation in their longitudinal orientation to one another.

A particle orientation, which in principle can also be achieved purely mechanically, can, for example, be effected by utilizing electrostatic effects. Other possibilities are the knife-coating onto surfaces known in principle from polymer physics or the spin-coating process. Orientation and simultaneous achievement of a greater density by forming higher crystalline structures may also be effected by the heat treatment also known from polymer physics. According to a preferred process path, the invention envisages a compaction by spinning in the case of carbon nanostructures which have the form of nanofibers or nanotubes.

An orientation of the carbon nanostructures, in particular fibrous carbon nanostructures, leads to a more compact macroscopic bundle. In particular, by means of a suitable arrangement, the interstices between the individual carbon nanostructures can be minimized, as result of which overall the apparent density of the carbon nanostructures is increased.

By means of an arrangement of the carbon nanostructures, it is additionally possible to cope in a specific manner with the expansion of the carbon nanostructures occurring owing to the charging with pressurized gas. Whereas non-ordered fibers expand, for example, in three dimensions, fibers ordered according to the invention expand essentially only in one dimension. The expansion in only one dimension, however, can be taken into account in a simple manner by appropriate packing of the vessel with the carbon nanostructures.

Advantageously, the conglomerates can be formed by additional pressing of the ordered carbon nanostructures. The pressing ensures a mechanical chaining of the carbon nanostructures. The pressing pressure is advantageously more than 1 bar.

According to a further embodiment, the conglomerates are formed by pressing non-ordered carbon nanostructures. This pressing can be achieved, for example, by simple compressionmolding of the material. In principle, pressed bodies in any shape and size can be pressed from the non-ordered carbon nanostructures.

In an advantageous embodiment, the conglomerates can be pressed in the form of pellets. Preferably, these pellets are spherical or tablet-shaped, so that they have a good flow behavior during packing into the pressurized gas vessel.

The pellets can be produced, for example, via a suitable punch press process or extrusion press process. In the punch press process, spherical pellets are preferably produced which ensure ready bulk flowability during the production of the gas accumulator. In the extrusion press process, cylindrical or parallelepipedal pellets are preferably produced.

According to the invention the solid packing can be composed of pellets of differing size and/or geometry. As result, a particularly high packing density can be achieved, since the remaining volume within the vessel which is not filled by solids is minimal.

In a further embodiment, the non-ordered or ordered carbon nanostructures can be formed as disk-shaped bodies having a base corresponding to the cross section of the vessel and stacked in the vessel one above the other. As a result, by stacking the individual disks one above the other virtually the entire vessel volume can be filled.

It is advantageous for the dynamics of charging and discharging the gas accumulator if, during production of the disk-shaped bodies, for example by pressing, gas-conducting structures (in particular at the surface) are incorporated into these. Structures of this type can be, for example, projecting ridges which serve as spacers between the disks, or else incorporated grooves through which the gas can flow preferentially. The disks can also be provided with continuous through-holes, which represent flow paths for the gas. If holes of this type are disposed coaxially one after the other in the individual disks, via a channel created in this manner, expediently, a filter tube can also be introduced into the vessel, which filter tube is connected to the valve-equipped feed line and outlet line for the gas (the feed line and the outlet line can also be physically separate).

As result of pressing the carbon nanostructure material, depending on the compaction employed, a surface film can develop on the surface of the conglomerates produced. A surface film of this type is disadvantageous for the diffusion behavior of the material with respect to the gas to be stored. Therefore, it is advisable in such a case to subject the conglomerates produced to a chemical surface treatment which improves the gas diffusion. A treatment of this type can advantageously be carried out in a wet-chemical or dry-chemical route by oxidation for instance using $O_2$, $CO_2$, $H_2O$ or similarly acting media.

According to the invention, in addition, a sheathing element can be provided which individually encloses the conglomerates formed from ordered or non-ordered carbon nanostructures. In particular, if the carbon nanostructures are ordered and not pressed, a suitable sheathing element, which is formed, for example, as a tube, can achieve the expansion of the carbon nanostructures being orientated in only one dimension, that is to say the longitudinal direction of the carbon nanostructures, during the charging with pressurized gas.

According to the invention, the carbon nanostructures can be embedded, to form the conglomerates, in a matrix, preferably a gas-permeable matrix. The matrix material used is preferably a chamber, pore or embedding system open to gas. It is conceivable, for example, to embed the carbon nanostructures into a polymer, for instance into Styropor, which ensures both a microscopic bonding of the carbon nanostructures, and a microscopic embedding into Styropor pores. The matrix material used can also be binders open to gas.

According to the invention the apparent density of the conglomerates produced from the originally loose particles of the carbon nanostructure material can be increased at least to 1.5 times, preferably at least to twice, the original apparent density. Usually, the original apparent density is approximately 1.0 g/cm$^3$, so that the values to be sought during the compaction are preferably minimum densities of 1.5 or 2.0 g/cm$^3$.

Surprisingly, the storage capacity, based on the weight of the carbon nanostructure material, despite the compaction carried out, is very largely retained. This leads to the fact that the storage capacity, based on the volume of the gas accumulator implemented according to the invention increases, essentially in accordance with the increase in apparent density of the conglomerates.

The compaction according to the invention of the carbon nanostructures is further accompanied by an important advantage. This is that the individual particles are inescapably held together, so that during discharging of the gas accumulator, an unwanted discharge of very small particles together with the gas stream taken off is counter-acted by this means. This is because, in some circumstances, escape of particles into downstream units or into the environment could lead to technical problems or contravene emission regulations relating to very fine particles.

In a further embodiment, in addition, at least one filter element, preferably a microfilter, can be provided on the feed line and/or the outlet line for the pressurized gas. The unwanted discharge of particles is still further reduced by the use of filters of this type. In the case of the microfilters, the material preferably consists of hydrogen-resistant materials, for example of inorganic or organic polymer films which are open to gas, ceramic materials, inert sintered steels which are open to gas or the like.

The various features of novelty which characterize the invention are pointed out with particularity in the claims annexed to and forming a part of the disclosure. For a better understanding of the invention, its operating advantages, and specific objects attained by its use, reference should be had to the descriptive matter in which there are described preferred embodiments of the invention.

What is claimed is:

1. A gas accumulator for storing pressurized gases, comprising: a sealed vessel; valve-actuated feed line for the pressurized gas connected to the vessel; an outlet line connected to the vessel; and a solid packing of carbon nanostructures, particles of the carbon nanostructures being compacted to give larger coherent conglomerates having an apparent density which is increased in comparison with apparent density of the particles when originally loose.

2. A gas accumulator as defined in claim 1, wherein the carbon nanostructures are formed as one of nanofibers, nanotubes and nanoshells.

3. A gas accumulator as defined in claim 1, wherein the carbon nanostructures are of helical shape.

4. The gas accumulator as defined in claim 1, wherein the carbon nanostructures are activated.

5. A gas accumulator as defined in claim 4, wherein the carbon nanostructures are activated by a reaction medium.

6. A gas accumulator as defined in claim 5, wherein the reaction medium is selected from the group consisting of alkali metals, alkaline earth metals, CO, $CO_2$ and helium.

7. A gas accumulator as defined in claim 1, wherein the carbon nanostructures are at least one of produced, activated and introduced into the gas accumulator in an absence of air.

8. A gas accumulator as defined in claim 1, wherein the carbon nanostructures are ordered in their orientation to one another so as to form the conglomerates.

9. A gas accumulator as defined in claim 8, wherein the carbon nanostructures are oriented essentially identically to one another in their longitudinal direction.

10. A gas accumulator as defined in claim 8, wherein the carbon nanostructures are formed as one of nanofibers and nanotubes that are compacted by spinning.

11. A gas accumulator as defined in claim 8, wherein the conglomerates are formed by additional pressing of the ordered carbon nanostructures.

12. A gas accumulator as defined in claim 8, wherein the ordered carbon nanostructures are formed as disk-shaped bodies having a base corresponding to a cross-section of the vessel and are stacked above one another in the vessel.

13. A gas accumulator as defined in claim 12, wherein gas-conducting structures are incorporated into a surface of the disk-shaped bodies.

14. A gas accumulator as defined in claim 1, wherein the conglomerates are formed of pressed non-ordered carbon nanostructures.

15. A gas accumulator as defined in claim 14, wherein the conglomerates are pressed in a pellet form.

16. A gas accumulator as defined in claim 15, wherein the pellets are one of tablet shaped and spherical.

17. A gas accumulator as defined in claims 15, wherein the solid packing is composed of pellets having at least one of differing size and differing geometry.

18. A gas accumulator as defined in claim 14, wherein the non-ordered carbon nanostructures are formed as disk-shaped bodies having a base corresponding to a cross-section of the vessel and are stacked above one another in the vessel.

19. A gas accumulator as defined in claim 18, wherein gas-conducting structure are incorporated into a surface of the disk-shaped bodies.

20. A gas accumulator as defined in claim 1, wherein a sheathing element is provided which encloses individually the conglomerates formed from the carbon nanostructures.

21. A gas accumulator as defined in claim 1, wherein the conglomerates, to remove a surface film, have a chemically treated surface which improves gas diffusion.

22. A gas accumulator as defined in claim 21, wherein the surfaces of the conglomerates are chemically treated by one of a wet-chemical and a dry-chemical oxidation treatment with one of $O_2$, $CO_2$, $H_2O$ and similarly acting media.

23. A gas accumulator as defined in claim 1, wherein the carbon nanostructures are embedded into a matrix to form the conglomerates.

24. A gas accumulator as defined in claim 23, wherein the matrix is a gas-permeable matrix.

25. A gas accumulator as defined in claim 1, wherein the apparent density of the conglomerates is increased to at least 1.5 times the original apparent density.

26. A gas accumulator as defined in claim 25, wherein the apparent density of the conglomerates is increased to at least twice the original apparent density.

27. A gas accumulator as defined in claim 1, wherein at least one filter element is provided in at least one of the feed line and the outlet line for the pressurized gas.

28. A gas accumulator as defined in claim 27, wherein the filter element is a nuicrofilter.

* * * * *